M. SHEPARD.
EGG CARRIER.
APPLICATION FILED JAN. 11, 1908.
898,514.
Patented Sept. 15, 1908.
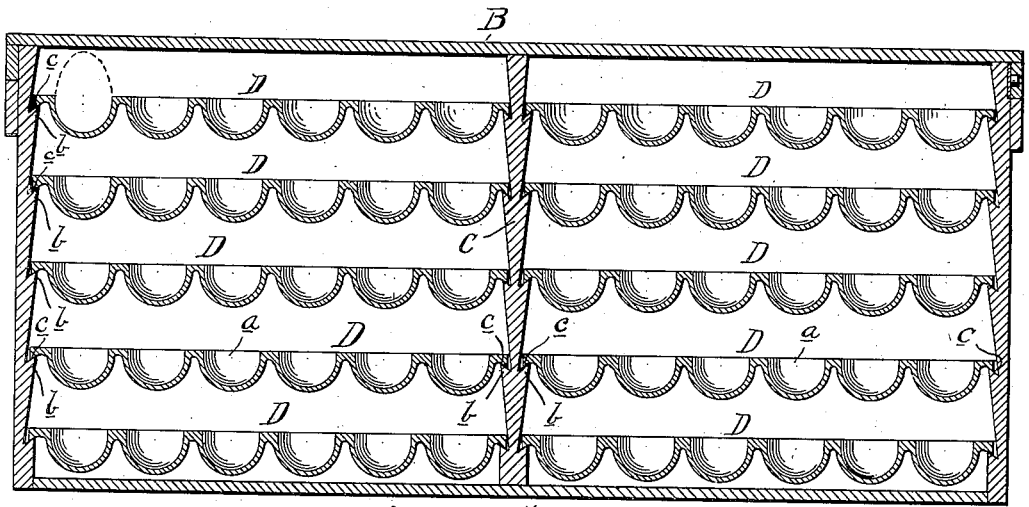
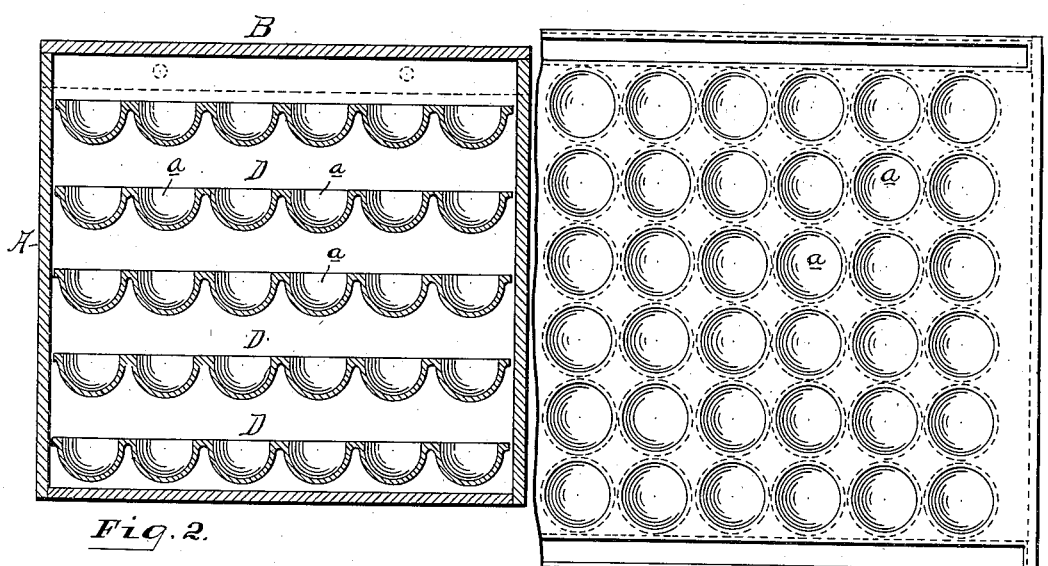
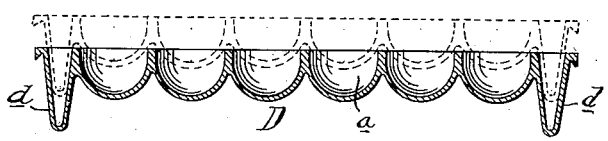
WITNESSES:
INVENTOR
MELZAR SHEPARD.
BY
ATTORNEYS

UNITED STATES PATENT OFFICE.

MELZAR SHEPARD, OF WAYNE, MICHIGAN.

EGG-CARRIER.

No. 898,514.  Specification of Letters Patent.  Patented Sept. 15, 1908.

Application filed January 11, 1908. Serial No. 410,339.

*To all whom it may concern:*

Be it known that I, MELZAR SHEPARD, a citizen of the United States of America, residing at Wayne, in the county of Wayne and State of Michigan, have invented certain new and useful Improvements in Egg-Carriers, of which the following is a specification, reference being had therein to the accompanying drawings.

This invention relates to that class of egg carrier in which a vertical series of horizontal egg supporting trays are removably supported in an outer casing and the object of the invention is to provide a simple and substantial carrier of this character in which due provision is made for the safe transport of the eggs all in the manner more fully hereinafter described and shown in the accompanying drawings, in which:—

Figure 1 is a vertical longitudinal section through an egg carrier adapted to receive the standard number of eggs and embodying my invention. Fig. 2 is a cross section of Fig. 1. Fig. 3 is a detached section of a modified form of tray, and Fig. 4 is a fractional plan view thereof.

A is an outer casing which I preferably provide with a removable cover B having suitable means for locking it in position. This casing is provided with a central transverse partition C dividing the same into two like compartments, each of which is adapted to contain a vertical series of shelves D which form egg holding trays.

These egg holding trays are preferably made of pressed wood pulp hardened and water proofed in the well known manner and integrally formed with a series of closely spaced cup shaped depressions $a$ for holding the eggs.

These shelves or trays are of a size to fit the compartments and they are removably supported therein at two opposite ends at suitable intervals apart to have each tray support its own weight of eggs. To this end the end walls and the middle partition of the case are correspondingly provided with horizontal ledges $b$ formed by cutting away portions of the wood in the casing preferably so as to form the supporting shoulder of the ledge on an upward incline and the trays are supported on these ledges and correspondingly provided with reinforced edges $c$ forming corresponding shoulders. By this construction I form what I call a safety carrier since it will be seen that while the trays can be readily removed and inserted into the casing by tipping each at an angle, they are virtually locked in position against displacement which would tend to lift them up at both ends such as would be occasioned by jolting in transportation or handling and the inclined shoulders of the ledges and of the trays provide enlarged bearing for the trays and prevent displacement thereof.

By forming the trays of wood pulp they are light and strong and damage to the eggs from contact therewith is minimized and should an egg become cracked the cups would collect the spill.

In the modified construction of tray shown in Fig. 4 the tray is formed at two opposite ends with spacing legs $d$. By using this construction, the trays may be supported one upon the other and the supporting ledges $b$ of the casing may then be dispensed with. As shown in the drawings I preferably form the legs $d$ hollow, just for the convenience of permitting the trays to be nested as shown by dotted lines in Fig. 4, when shipping the empty trays, it will be understood however that in packing the casing with these trays filled with eggs the trays are superposed with their legs alternately on different sides of the casing.

What I claim as my invention is:—

1. An egg carrier comprising a vertical series of egg-holding trays and a casing in which said trays are supported, the casing having vertical walls, two of which on opposite sides are provided with recesses into which the ends of the trays project, said recesses forming a series of inclines on the inner faces of said walls adapted to permit the insertion and removal of the trays through the top of the casing in the manner described.

2. In an egg carrier, the combination of a casing provided with a removable cover on top and having vertical end and side walls, the inner walls on two opposite sides provided with ledges formed by cutting away portions of said walls between the ledges, the faces of said walls between said ledges being inwardly inclined, and a vertical series of egg holding shelves or trays removably supported on said ledges.

3. In an egg carrier, the combination of a casing provided with a removable cover on top and having vertical end and side walls, the inner faces of the walls on two opposite sides being provided with ledges formed by cutting away portions of said walls between the ledges, the faces of the walls between the ledges being inwardly inclined and the supporting shoulders of the ledges being upwardly inclined, and a vertical series of egg holding shelves or trays removably supported on said ledges and provided with reinforced supporting edges conforming to the inclines of the supporting shoulders of the ledges.

In testimony whereof I affix my signature in presence of two witnesses.

MELZAR SHEPARD.

Witnesses:
C. R. STICKNEY,
A. M. DORR.